United States Patent Office.

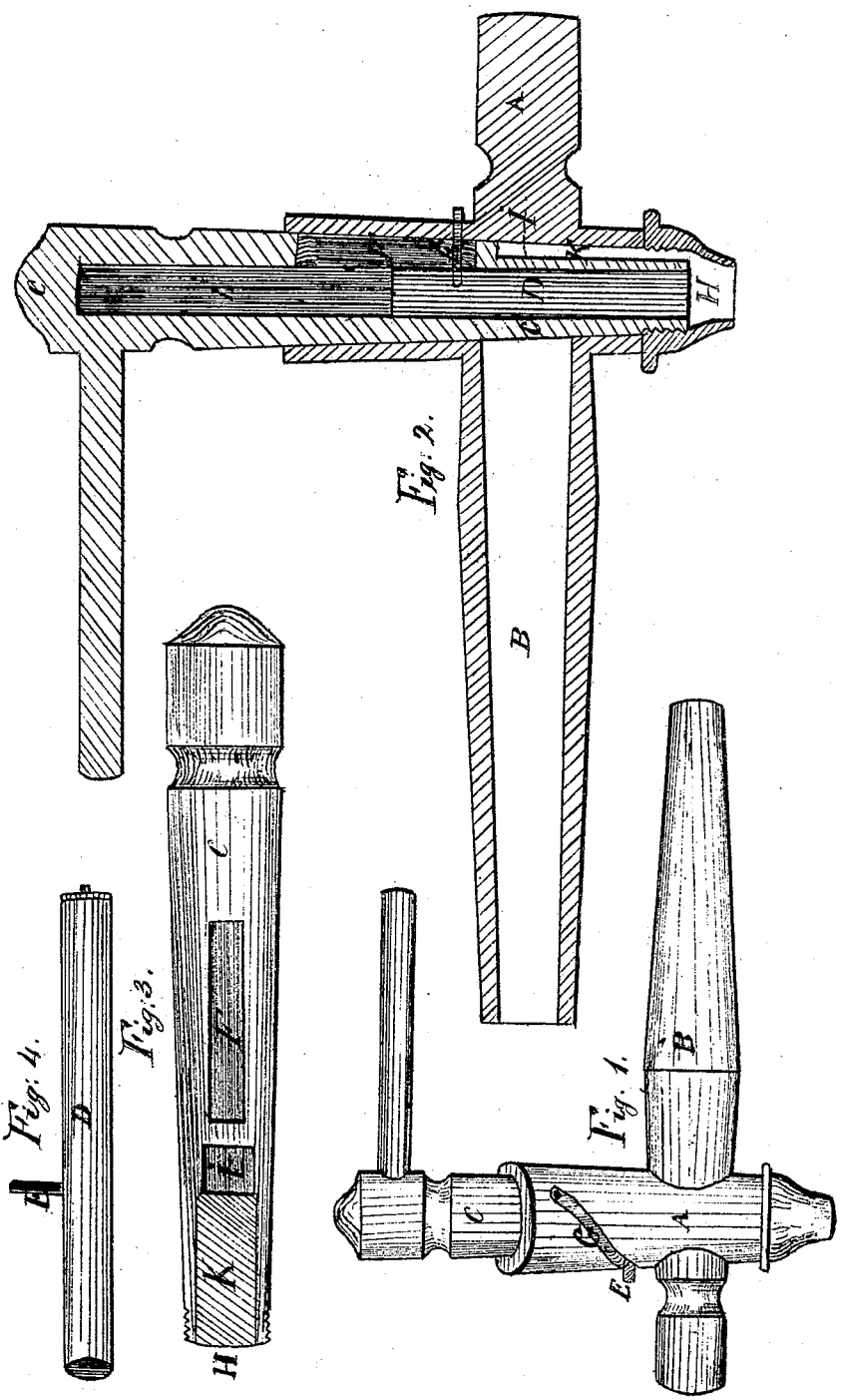

FELIX MANZ, OF ALLEGHENY CITY, PENNSYLVANIA.

Letters Patent No. 101,966, dated April 12, 1870.

IMPROVEMENT IN BEER-FAUCETS.

The Schedule referred to in these Letters Patent and making part of the same

I, FELIX MANZ, of the city and county of Allegheny, of the State of Pennsylvania, have invented certain Improvements in Beer-Faucets, of which the following is a specification.

Nature and Objects of the invention.

The nature of my invention consists in constructing a beer or ale-cock in such a maner that, as the beer or ale is drawn from the barrel, the faucet by means of a plunger contained in it, will force the beer or ale through the valve, thereby causing the old, as well as new beer, to produce a rich creamy surface.

Description of drawings.

Figure 1 is an elevation on a reduced scale.
Figure 2 a longitudinal and vertical section.
Figure 3 an elevation of the valve.
Figure 4 an elevation of the plunger.

General Description.

The construction of my invention is as follows.

The accompanying drawing represents an ordinary faucet, of which—

A is the valve seat, with arm B, which enters the beer barrel.

C is the valve containing in it the plunger D.

The lower end of the valve C is provided with a small perforation H, and also has on the side of it a square opening I, through which the beer enters into the interior of the valve when turned to the proper direction.

Now, this plunger D manipulates, by means of the following description:

The valve seat A has through it, from about the middle to the top, a rising curve, or slot G.

The valve C contains through the center of it a circular or cylindrical opening L, forming the pump-barrel, into which the plunger D, is tightly fitted.

The valve C, has a straight slot F.

Now, place the valve C into the valve-seat A, and enter the pin E through the rising slot G and through the straight slot F in valve C, and screw it tightly into the plunger D. The manipulation will be created by turning the valve C in the proper direction.

The pin E will be compelled to rise through the straight slot F, in consequence of the valve-seat A having a rising curve G, which has an elevation proportionately to the length of the pump contained in valve C.

The passage of the beer is produced by providing the valve C with a flat surface K, below the opening of the pump I, thus leaving sufficient room for the passage of beer or ale.

Claim.

Having thus described the nature of my invention, What I claim, and desire to secure by Letters Patent, is—

The combination of the valve C with the perforation H, and side opening I, in connection with plunger D, caused to manipulate by the slots G and F, so as to force the beer through the perforation H when the valve is being turned off, and produce a creamy surface when tapped in a vessel, substantially as and for the purpose herein specified.

FELIX MANZ.

Witnesses:
EDM. F. BROWN,
PHILIPP HEINRICH.